June 24, 1924. 1,498,576
E. REINBOLD
SLED
Filed April 24, 1923
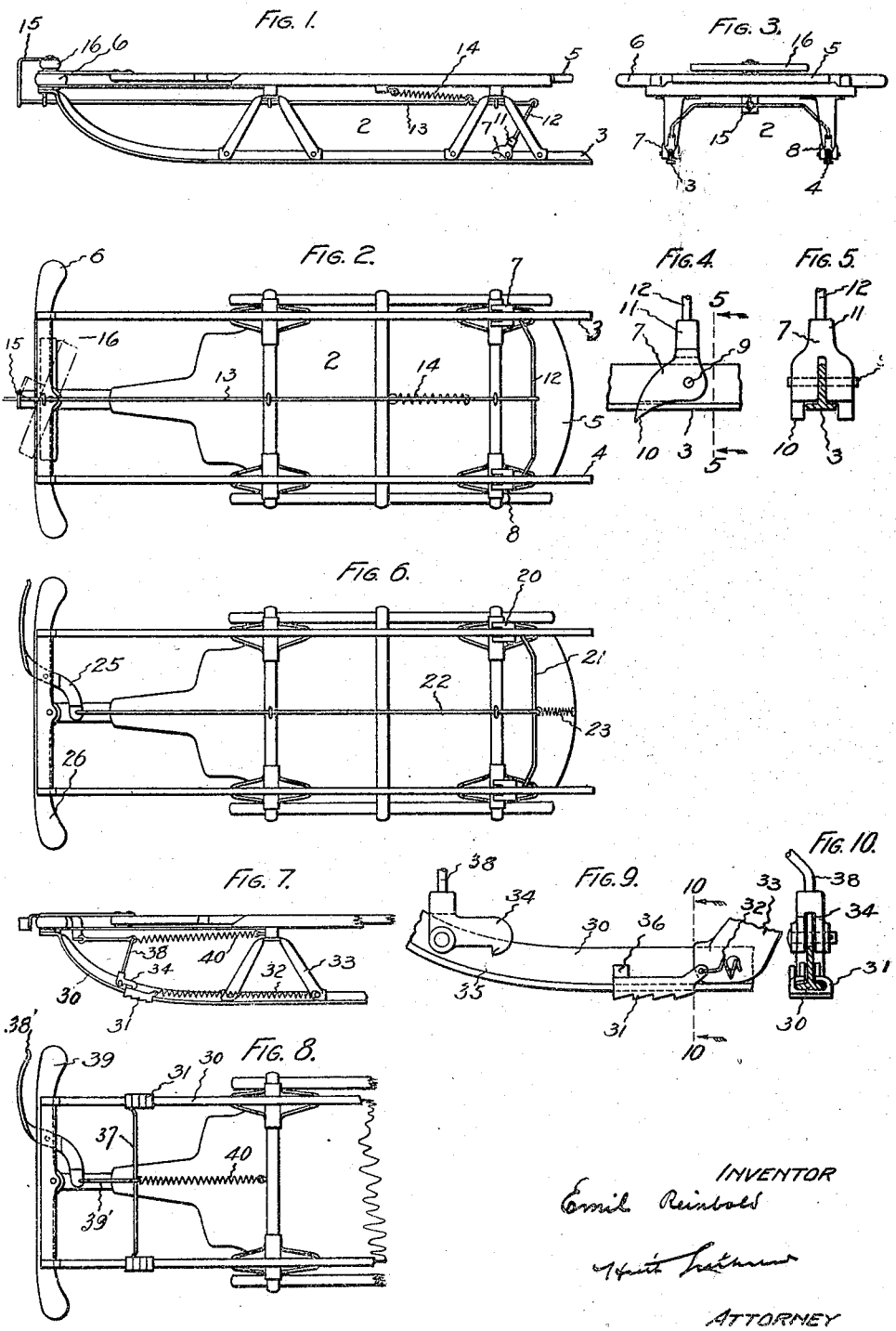
INVENTOR
Emil Reinbold
ATTORNEY Patented June 24, 1924.

1,498,576

UNITED STATES PATENT OFFICE.

EMIL REINBOLD, OF HARTFORD, CONNECTICUT, ASSIGNOR OF ONE-HALF TO ALEX BERNHEIMER, OF NEW YORK, N. Y.

SLED.

Application filed April 24, 1923. Serial No. 634,269.

*To all whom it may concern:*

Be it known that EMIL REINBOLD, citizen of the United States, residing at Hartford, in the county of Hartford and State of Connecticut, has invented certain new and useful Improvements in Sleds, of which the following is a specification.

This invention relates to sleds. One of the principal objects I have in view is the provision of brake mechanism which is simple in construction and which is effective in action, and which is desirably operative automatically so that in the event the user desires to stop the sled this condition can be brought about instantly by the setting of the brake mechanism. There are usually two brakes and ordinarily they are operatively associated with the runners of the sleigh of whatever construction the same may be.

The invention is capable of wide modification. In the drawing accompanying and forming part of the present specification, I have represented in detail several of the many forms of embodiment of the invention which, to enable those skilled in the art to practice the same, will be set forth fully in the following description.

Referring to said drawing:

Fig. 1 is a side elevation of a sled equipped with brake mechanism involving the invention.

Fig. 2 is a bottom plan of the sled.

Fig. 3 is a rear elevation.

Fig. 4 is a detail view of a portion of a runner, equipped with brake involving the invention.

Fig. 5 is a cross section on the line 5—5 of Fig. 4 looking in the direction of the arrows.

Fig. 6 is a bottom plan view of a modification.

Fig. 7 is a side elevation of another modification.

Fig. 8 is a bottom plan view of the same.

Fig. 9 is a side view on an enlarged scale showing the brake member as released.

Fig. 10 is a cross section on the line 10—10 of Fig. 9 looking in the direction of the arrows.

Like characters refer to like parts throughout the several views.

I will first describe the structure shown in Figs. 1 to 5.

In the several views the sled is denoted in a general way by 2. It comprises side runners, as 3 and 4, and a top 5 upon which the occupant of the sled usually rests in coasting or in sliding. The runners are connected at their forward upper sides by a cross bar 6, the ends of which extend laterally from the runners 3 and 4 so as to be grasped in coasting.

Associated with the runners, as 3 and 4, are brakes such as 7 and 8, the brake shown in Figs. 4 and 5 is assumed to be that in the foreground in Fig. 1 or the one below in Fig. 2, or at the left of the sled. Each of the brakes 7 and 8 consist of claw-like parts which are slotted to straddle the web portion of the runners 3 and 4 near the rear ends thereof and are pivoted thereto, as at 9, by a pin which extends through the body of the respective brakes and also through the web portion of the runners. Each brake comprises at its operative portion a pointed toe 10, which when in operative relation extends below the active portion of the runners so as to dig into the ground which is usually covered with snow.

As shown each of the bodies of the brakes 7 and 8 has an up-standing shank as 11. It is desirable that the brakes should be set or unset in synchronism and for this purpose they are operatively connected as by the cranked cross bar 12 which has a connection with the upper ends of the shanks 11 as shown for instance in Fig. 3.

Extending forwardly from the cranked cross bar 12 is a rod, as 13, which is disposed longitudinally centrally of the sled on the under-side thereof, the cross bars of the sled usually having eyes to guide the rod 13 in its necessary movements forwardly and backwardly. To the rod is connected a spring, as 14, which as shown has at its forward end a connection with the body or upper portion of the sled 2, as clearly shown in Fig. 1.

In action the rod 13 will be drawn rearwardly thus stretching the spring 14 and by reason of the connection of said rod operatively with the two brakes moving their pointed portions 10 above the under-surface of the runners 3 and 4 of the sled, which is the ineffective position of the brake members and which is shown in Fig. 1. This relation is maintained by a latch member 15, which is shown in operative relation in Figs. 1 and 2, in full lines in the latter figure. When the latch member 15 is tripped as by the tripper 16 and which usually consists of a rock lever pivoted between its ends to the upper side of the cross bar 6, the rod 13 will be released and can be shot forward by the spring 14. The tripper 16 is within easy reach of the occupant of the sled, as will be clear, and when the brakes are to be set the tripper is swung around to the dotted line shown in Fig. 2, thus carrying the latch member 15 free of the forward end of the rod 13 so that it can be shot forward, as explained, by the spring 14, at this time under tension so as to instantly move through the intervening parts, the toes 10 into digging relation with the surface of the ground and thus stop further progress forwardly of the sled.

In the structure represented in Fig. 6 the runners of the sled have brakes 20 which are operatively connected by the crank shaft 21. To the crank shaft 21 is connected the rod 22 which extends forwardly therefrom and to the rear end which is connected with spring 23. To the front end of the rod 22 is connected a lever 25 pivoted between the ends to the cross bar 26. In the modified construction which I am now describing, there is no latch. In this construction the handle portion of the lever 25 is within the grasp of the individual occupying the sled. When he draws back the handle portion of the lever 25 to the right in Fig. 6, the two brakes 20 are set. At the same time the spring 23 is stretched so that when the hand is taken from the lever 25 the spring will return the parts to their initial position and with the brakes 20 unset.

This invention contemplates, as I have practically already observed broadly, the association operatively with a sled of a brake. This brake can be mounted in divers ways with the sled, two of which have been described. In both of these constructions the brake is supported by the rear parts of the runners. In Figs. 7 to 10 inclusive I show a different construction. In this case each runner 30 has upon it slidably a brake member, as 31, which when in operative relation, as shown in Figs. 7 and 8, is normally above the surface which the respective runners 30 travel. Associated with each brake member is a spring as 32 which is connected at its forward end to a lug on the brake member and at its rear end is connected to one of the bars 33, or to a stud thereon. The brake members are normally held in inactive relation with the springs 32 under stretch by latches as 34, the toes 35 of which normally engage a catch as 36 on the respective brakes 31, as shown in Figs. 7. The brakes 31 are connected for simultaneous movement by a cross bar, as 37, which may have integral side arms 38 and which, as shown are rigid with the ears 34.

In Figs. 7 and 8 the brake members 31 are assumed to be locked by the latches 34 at which time the springs 32 are under maximum tension. When the latches 36 are tripped, the tensioned springs 32 will draw the brake members 31 backwardly so that the teeth on the under surface thereof will be brought into contact with the surface on which the runners 30 travel.

A tripper, as 38', is pivoted between its ends upon the cross bar 39 and is jointed to the link 39' which is likewise connected with the cross bar 37. The handle portion of the tripper 38' which is usually in the form of a lever is within easy reach of the hand of an occupant of the sled to enable the said occupant to swing the tripper or lever 38 and thus effect the release of the latch 36 which is at once drawn rearwardly from its inoperative relation to brake checking or operative position.

What I claim is:

1. The combination of a sled, brake means operatively associated with the sled, spring means tending constantly to shift the brake means from an inoperative to an operative position, latch means for normally holding the brake means in an inoperative relation, and means set by the occupant of the sled to trip the latch means.

2. The combination of a sled, brakes straddling the runners of the sled, spring means tending to constantly shift the brakes from an inoperative to an operative relation, latches to hold the brakes in their inoperative relation, and means for tripping the latches.

In testimony whereof I affix my signature.

EMIL REINBOLD.